US009203937B2

(12) United States Patent
Richardson

(10) Patent No.: US 9,203,937 B2
(45) Date of Patent: Dec. 1, 2015

(54) APPARATUS AND METHOD FOR MOBILE DEVICE SPEAKER PORT

(75) Inventor: Nigel Richardson, Farnham (GB)

(73) Assignee: Nokia Technologies Oy, Espoo (FI)

( * ) Notice: Subject to any disclaimer, the term of this patent is extended or adjusted under 35 U.S.C. 154(b) by 158 days.

(21) Appl. No.: 13/814,046

(22) PCT Filed: Aug. 5, 2010

(86) PCT No.: PCT/IB2010/053555
§ 371 (c)(1),
(2), (4) Date: Mar. 12, 2013

(87) PCT Pub. No.: WO2012/017270
PCT Pub. Date: Feb. 9, 2012

(65) Prior Publication Data
US 2013/0170120 A1 Jul. 4, 2013

(51) Int. Cl.
*H05K 5/02* (2006.01)
*H04M 1/02* (2006.01)
*G06F 1/16* (2006.01)
*H04M 1/03* (2006.01)

(52) U.S. Cl.
CPC ........... *H04M 1/0216* (2013.01); *G06F 1/1616* (2013.01); *G06F 1/1684* (2013.01); *H04M 1/0214* (2013.01); *H04M 1/03* (2013.01)

(58) Field of Classification Search
CPC .................................. H04M 1/02; H05K 5/02
USPC ............ 361/679.01–679.45, 679.55–679.61, 361/724–747, 752–759, 796–837; 248/309.1, 316.8, 917, 922, 923, 248/346.4; 312/223.2, 7.1, 319.9, 333, 312/348.3, 222, 226; 455/575.1–575.5, 455/347, 550.1, 90.3
See application file for complete search history.

(56) References Cited

U.S. PATENT DOCUMENTS

| 5,644,338 | A  | * | 7/1997  | Bowen   | 345/168    |
|-----------|----|---|---------|---------|------------|
| 7,061,520 | B2 | * | 6/2006  | Choi    | 348/14.02  |
| 7,110,796 | B2 | * | 9/2006  | Lee     | 455/566    |
| 7,599,724 | B2 | * | 10/2009 | Cho et al. | 455/575.4 |
| 7,606,605 | B2 | * | 10/2009 | Lee et al. | 455/575.3 |
| 7,702,096 | B2 | * | 4/2010  | Kim     | 379/433.12 |
| 7,725,137 | B2 | * | 5/2010  | Lee     | 455/572    |
| 7,777,450 | B2 | * | 8/2010  | Lee et al. | 320/115 |
| 7,813,775 | B2 | * | 10/2010 | Hyun et al. | 455/575.3 |
| 7,873,396 | B2 | * | 1/2011  | Kang et al. | 455/575.3 |
| 7,959,366 | B2 | * | 6/2011  | You     | 400/88     |
| 8,042,231 | B2 | * | 10/2011 | Bae et al. | 16/367  |
| 8,060,030 | B2 | * | 11/2011 | Rhee et al. | 455/90.3 |
| 8,122,568 | B2 | * | 2/2012  | Jin et al. | 16/357   |

(Continued)

FOREIGN PATENT DOCUMENTS

| JP | 2009-088667 A | 4/2000 |
|----|---------------|--------|
| JP | 2006-138958 A | 6/2006 |
| JP | 2009-0006356 A | 1/2009 |

*Primary Examiner* — Courtney Smith
*Assistant Examiner* — Rashen E Morrison
(74) *Attorney, Agent, or Firm* — Harrington & Smith

(57) ABSTRACT

An apparatus including a main section including a display configured to be located on a first face of the main section; at least one movable section coupled to the main section, the at least one movable section including at least one acoustic transducer port located on a first face of the movable section, wherein in a first mode of operation the first face of the at least one movable section is configured to form an extension of the first face of the apparatus and locate the acoustic transducer port on the same face as the display.

22 Claims, 6 Drawing Sheets

(56) References Cited

U.S. PATENT DOCUMENTS

| | | | |
|---|---|---|---|
| 8,478,366 B2* | 7/2013 | Shin et al. | 455/575.1 |
| 8,560,003 B2* | 10/2013 | Kwak et al. | 455/550.1 |
| 2001/0034229 A1* | 10/2001 | Park et al. | 455/426 |
| 2002/0058531 A1 | 5/2002 | Terasaki et al. | 455/556 |
| 2005/0192066 A1* | 9/2005 | Park et al. | 455/575.3 |
| 2006/0183435 A1* | 8/2006 | Chen | 455/90.3 |
| 2007/0060214 A1* | 3/2007 | Sung et al. | 455/575.1 |
| 2009/0001232 A1* | 1/2009 | Seo et al. | 248/176.1 |
| 2013/0170120 A1* | 7/2013 | Richardson | 361/679.3 |

\* cited by examiner

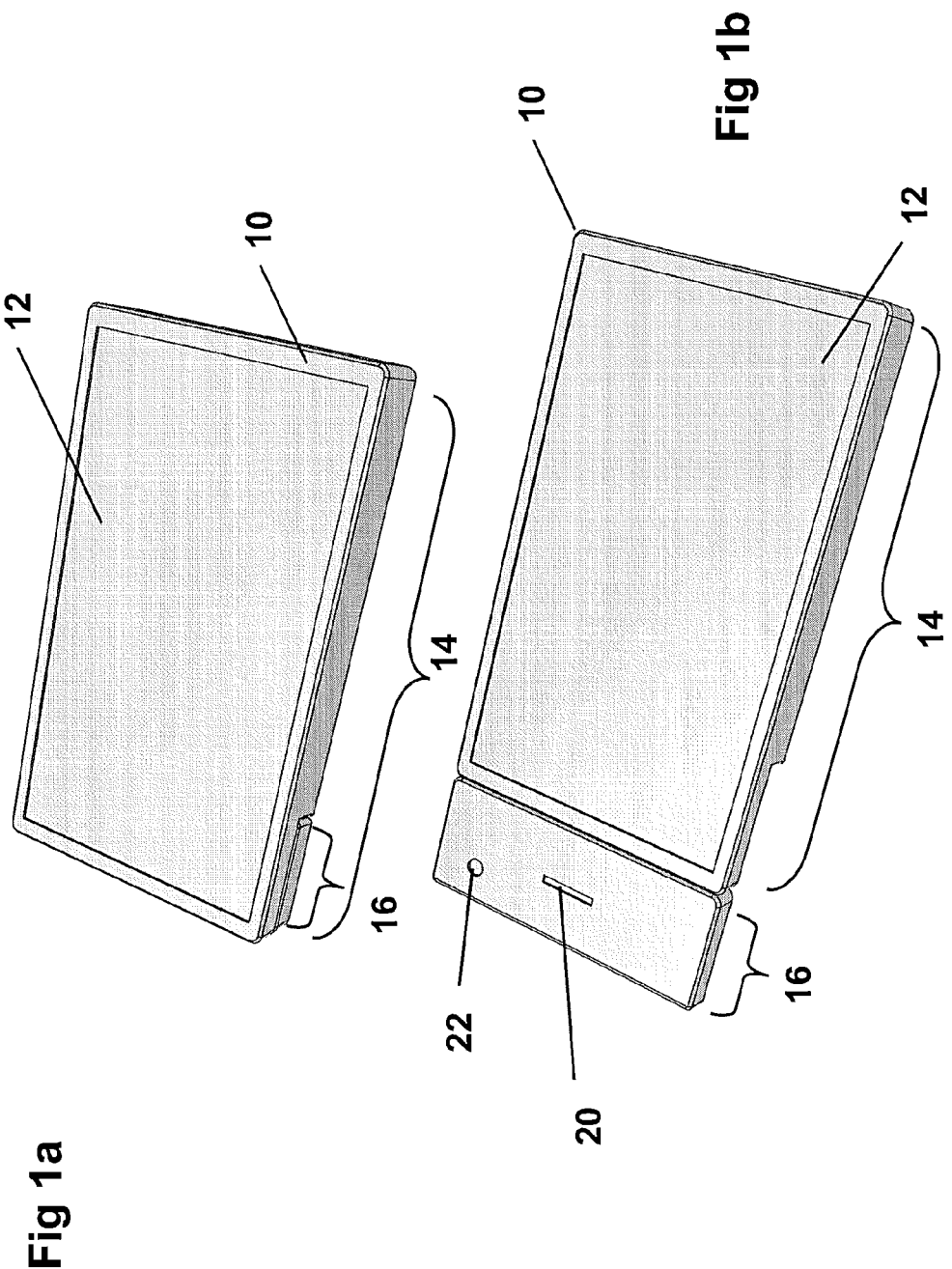

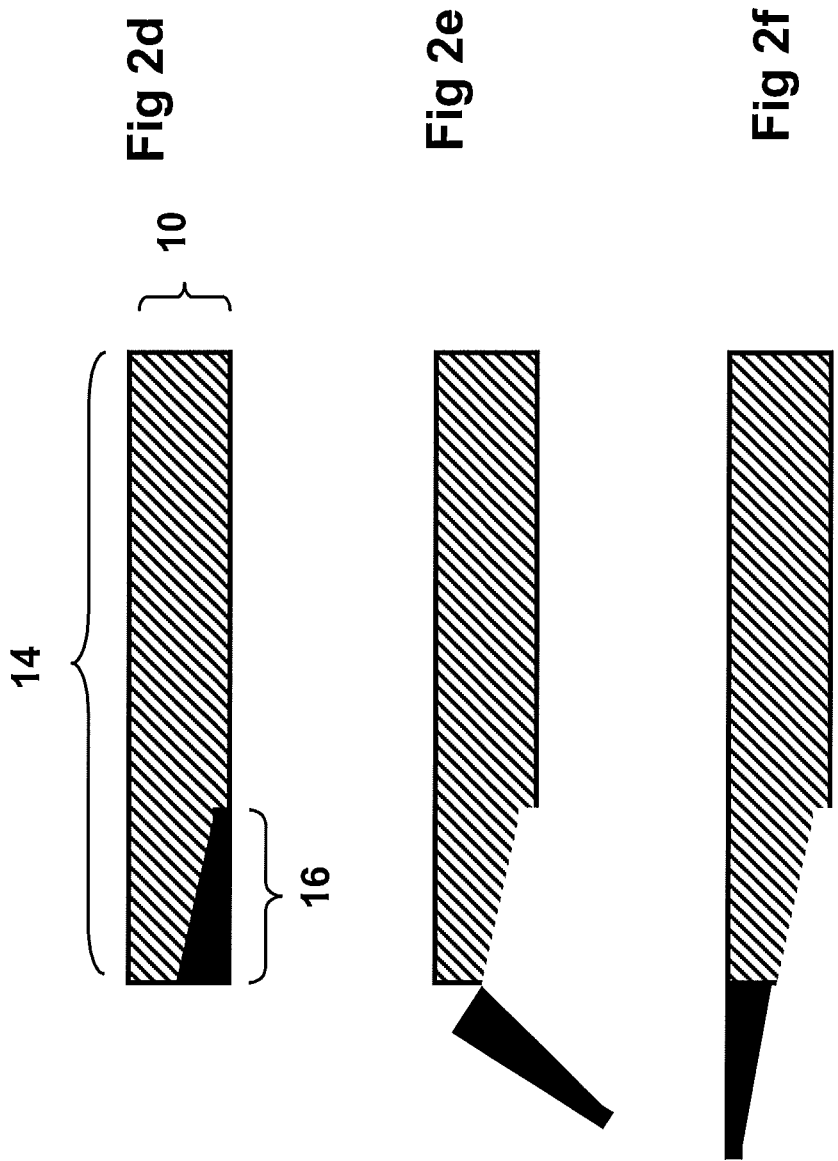

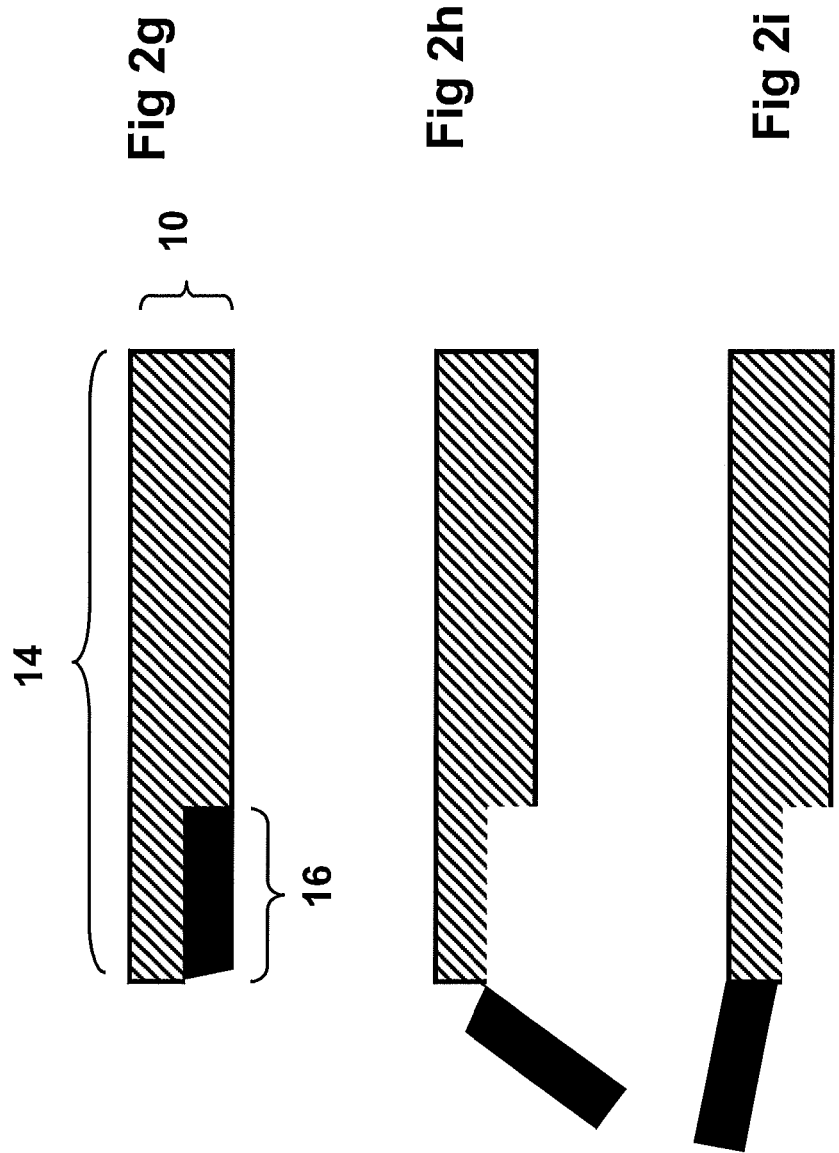

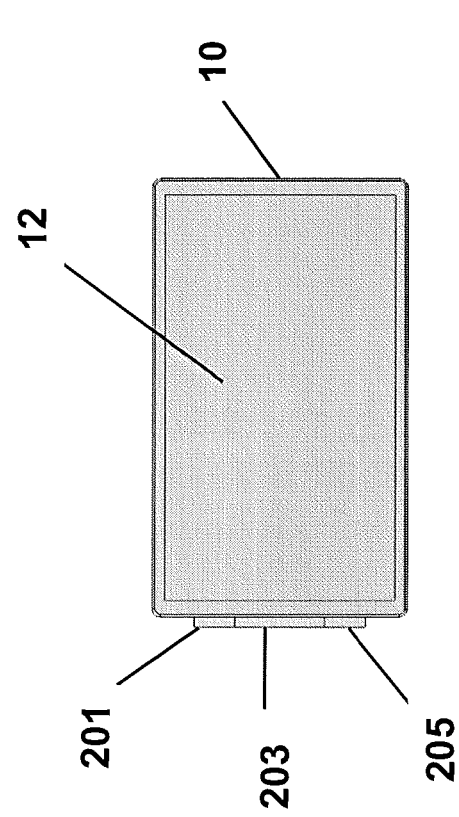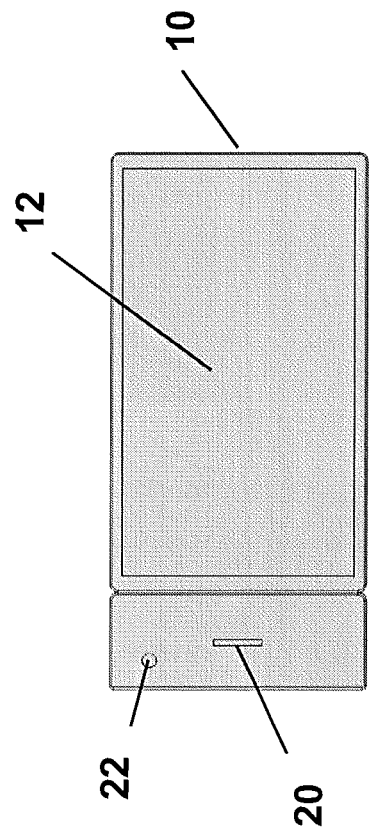
Fig 3a
Fig 3b

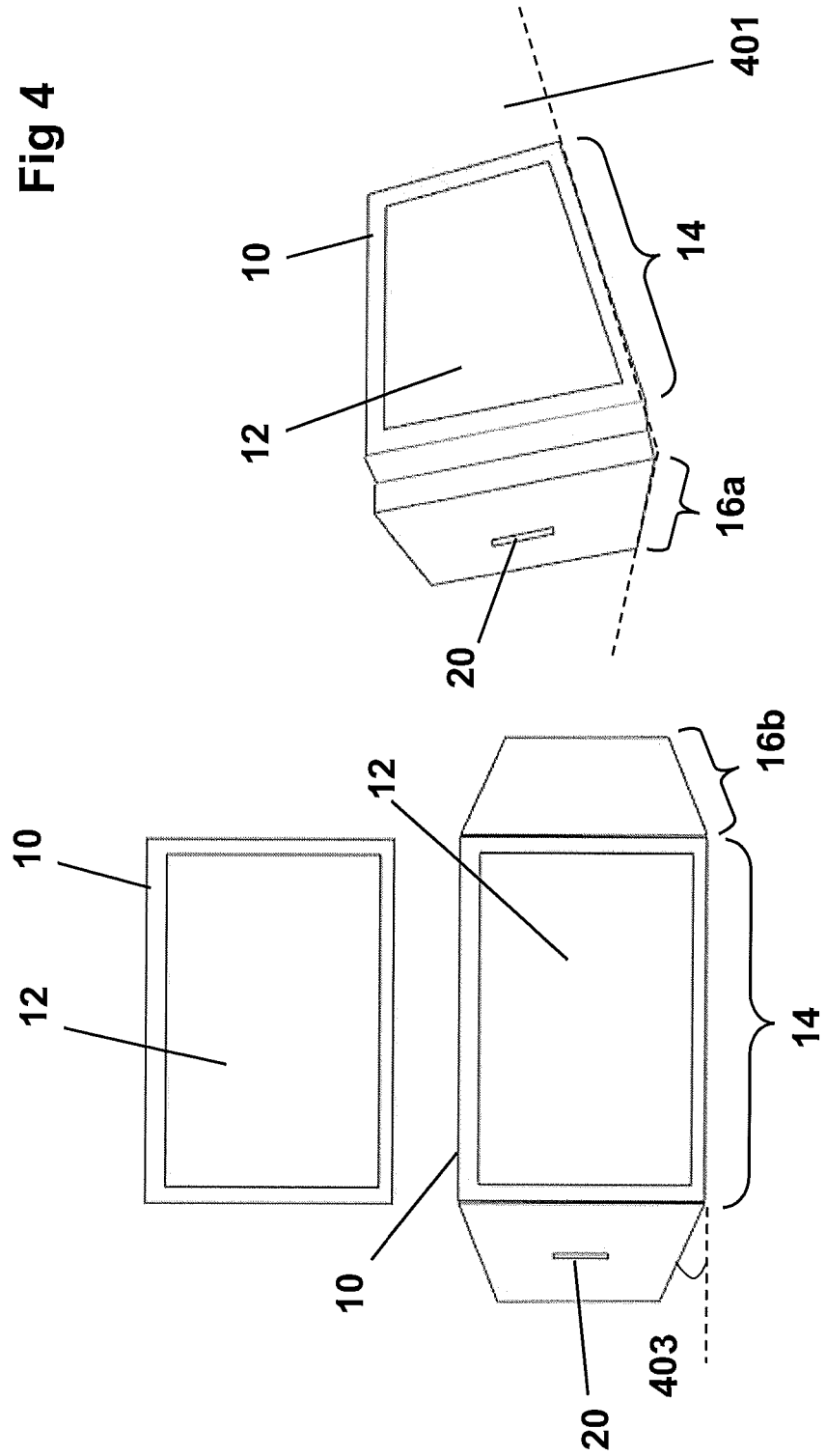

APPARATUS AND METHOD FOR MOBILE DEVICE SPEAKER PORT

FIELD OF THE APPLICATION

The present application relates to structure and configuration of earpiece and speaker apparatus in electronic apparatus. The invention further relates to, but is not limited to, structure and configuration of earpiece and speaker apparatus in portable communication apparatus.

BACKGROUND OF THE APPLICATION

The growth in the use of portable electronic devices such as mobile communication devices, cellular telephones and the like has driven the design of such devices to become smaller and more convenient. Consumers have become accustomed to the convenience and portability of such electronic devices, particularly, cellular telephones and other convergence devices, such as audio and audio-video devices with communication capabilities and have demanded that those devices become even more convenient and even more portable. The constant thrust in portable device design is thus to make the device as small as possible.

There is a further movement in portable device design in making the device display as large as possible in order to present a user interface experience which is as full as possible. For example to make the display capable of displaying images with as much detail as possible, and to provide input from the user without the disadvantages associated with a small display touch screen device.

However the compromise and problem associated with the combination of both making the device as small as possible but the display as large as possible within the device size has been to push the non-display components and in particular the earpiece/speaker mechanical integration components towards the edge of a portable device. This not only causes problems with respect to integration of internal earpiece/speaker mechanical components but also provides a much smaller surrounding surface neighbouring the earpiece port which causes producing a sufficiently good acoustic seal between the apparatus and the user's ear difficult and therefore reduces significantly the earpiece performance.

Embodiments of the present application aim to address the above problem.

SUMMARY OF THE APPLICATION

There is provided according to a first aspect of the application an apparatus comprising: a main section comprising a display configured to be located on a first face of the main section; at least one movable section coupled to the main section, the at least one movable section comprising at least one acoustic transducer port located on a first face of the movable section, wherein in a first mode of operation the first face of the at least one movable section is configured to form an extension of the first face of the apparatus and locate the acoustic transducer port on the same face as the display.

The at least one movable section and main section may co-operate to produce an acoustic sealing surface.

The main section may comprise a second face and in a second mode of operation the first face of the at least one movable section may be configured to form an extension of the second face of the main section to locate the transducer port on a different face to the display.

The main section may further comprise a recess and in the second mode of operation the at least one movable section may be located within the main section recess.

The at least one movable section may be configured to locate the movable section in a plane relative to the main section.

The apparatus may further comprise at least one acoustic transducer coupled to the at least one acoustic transducer port.

The acoustic transducer may comprise at least one of: an earpiece; a speaker; a microphone; and an integrated hands-free speaker.

The acoustic transducer may be located in the movable section.

The at least one movable section may further comprise an image capturing apparatus located on the first face of the movable section.

The at least one movable section may be configured to support the main section on a surface.

The at least one movable section may comprise at least one of: a chamfered edge; a filleted edge; a shaped edge; and a bevelled edge.

The apparatus may further comprise a coupling configured to couple the movable section and the main section.

The coupling may comprise at least one of: a hinge; a slider; a lockable coupling; a motorized coupling; a mechanical coupling; an acoustic coupling; and an electrical coupling.

According to a second aspect of the application there is provided a method comprising: coupling a main section comprising a display configured to be located on a first face of the main section and at least one movable section coupled to the main section wherein the at least one movable section comprises at least one acoustic transducer port located on a first face of the movable section; and locating the first face of the at least one movable section to form an extension of the first face of the apparatus such that the acoustic transducer port is located on the same face as the display.

The at least one movable section and main section may co-operate to produce an acoustic sealing surface.

The main section may comprise a second face and the method may further comprise: locating the first face of the at least one movable section to form an extension of the second face of the main section such that the transducer port is located on a different face to the display.

The main section may further comprises a recess and locating the first face of the at least one movable section to form an extension of the second face of the main section may further comprise locating the at least one movable section within the main section recess.

The method may further comprise locating the at least one movable section in a plane relative to the main section.

The method may further comprise coupling at least one acoustic transducer to the at least one acoustic transducer port.

The acoustic transducer may comprise at least one of: an earpiece; a speaker; a microphone; and an integrated hands-free speaker.

The method may further comprise locating the acoustic transducer in the movable section.

The method may further comprise locating an image capturing apparatus on the first face of the movable section.

The method may further comprise supporting the main section on a surface using the at least one movable section.

The at least one movable section may comprise at least one of: a chamfered edge; a filleted edge; a shaped edge; and a bevelled edge.

The method may further comprise coupling the movable section and the main section.

The coupling may comprise at least one of: a hinge; a slider; a lockable coupling; a motorized coupling; a mechanical coupling; an acoustic coupling; and an electrical coupling.

According to a third aspect there is provided an apparatus comprising: body means comprising display means located on a first face of the body means; movable means coupled to the body means comprising at least one acoustic means located on a first face of the movable means, wherein in a first mode of operation the first face of the at least one movable means is configured to form an extension of the first face of the body means and locate the acoustic means on the same face as the display means.

The at least one movable means and body means may co-operate to produce an acoustic sealing surface.

The body means may comprise a second face and in a second mode of operation the first face of the at least one movable means is configured to form an extension of the second face of the body means to locate the acoustic means on a different face to the display means.

The body means may further comprise a recess and in the second mode of operation the at least one movable means is located within the body means recess.

The apparatus may further comprise at least one acoustic transducer coupled to the acoustic means.

The acoustic transducer may comprise at least one of: an earpiece; a speaker; a microphone; and an integrated hands-free speaker.

The acoustic transducer may be located in the movable means.

The at least one movable means may further comprise an image capturing apparatus located at least partially on the first face of the movable means.

The at least one movable means may be configured to support the body means on a surface.

The at least one movable means may comprise at least one of: a chamfered edge; a filleted edge; a shaped edge; and a bevelled edge.

The apparatus may further comprise coupling means configured to couple the movable means and the body means.

The coupling may comprise at least one of: a hinge; a slider; a lockable coupling; a motorized coupling; a mechanical coupling; an acoustic coupling; and an electrical coupling.

BRIEF DESCRIPTION OF DRAWINGS

For better understanding of the present application, reference will now be made by way of example to the accompanying drawings in which:

FIG. 1a shows schematically a projected view of an electronic device employing embodiments of the application in a first mode of operation;

FIG. 1b shows schematically a projected view of the electronic device shown in FIG. 1a in a second mode of operation;

FIGS. 2d to 2i show schematically further elevations of the electronic device shown in FIG. 1a;

FIG. 3a shows schematically a plan view of the electronic device shown in FIG. 1a in the first mode of operation; FIG. 3b shows schematically a plan view of the electronic device shown in FIG. 1a in the first mode of operation; and FIG. 4 shows schematically a series of views of a further electronic device employing embodiments of the application.

DETAILED DESCRIPTION OF SOME EMBODIMENTS

Figure 2A:
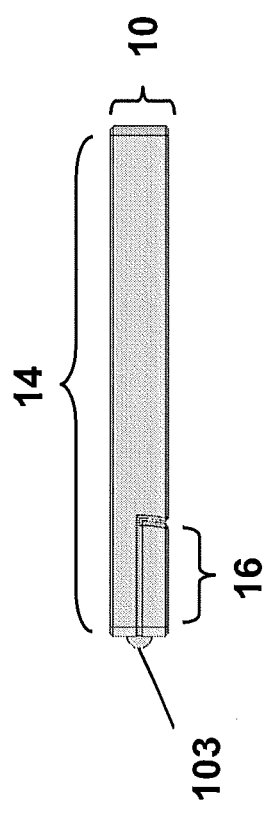
FIG. 2a shows schematically an elevation of the electronic device shown in FIG. 1a in the first mode of operation.

The following describes apparatus and methods for improved earpiece mechanical integration in electronic devices or apparatus. In this regard reference is made to FIGS. 1a and 1b which show a schematic view of an exemplary electronic device or apparatus 10 which can comprise embodiments of the application. For example the apparatus 10 in some embodiments can comprise a foldable section 16 comprising a mechanical earpiece integration operable in at least a first mode (or folded mode) as shown in FIG. 1a and a second mode (or unfolded mode) as shown in FIG. 1b of operation, whereby the earpiece mechanical integration is substantially aligned with the display.

The electronic device or apparatus 10 can, for example, be a mobile terminal or user equipment for wireless communication. In some other embodiments the electronic device or apparatus 10 can be an audio player (also known as MP3 players), a media player (also known as MP4 players), or an electronic book reader. In some other embodiments the apparatus 10 can be any suitable electronic device such as a personal data assistance (PDA), personal computer (such as a netbook, tablet or other mobile personal computer), or an electronic wallet.

The device 10 in some embodiments comprises a main section or main body section 14 or any suitable body means. Furthermore the main section 14 can in some embodiments comprise a display 12 mounted on the frame of the device and which is suitable for providing the user with a user interface for displaying data. The display 12 in some embodiments can further be a touch screen display unit suitable for providing the user of the device not only with displayed information but the ability via a touch sensitive area to relay touch based selections to the apparatus.

In some further embodiments the apparatus can comprise input switches or buttons (not shown) suitable for providing further input to the apparatus via a user interface other than the display 12.

The main body section 14 in some embodiments can comprise and protect within the main section casing further components of the apparatus.

The apparatus 10 in some embodiments comprises a transceiver (TX/RX) for transmitting and receiving data with further apparatus via a wireless communications protocol. Any suitable wireless communication protocol can be implemented in embodiments of the application. In some embodiments the transceiver can be located within the main section 14 of the apparatus.

The transceiver in some embodiments enables communication with other apparatus, for example via a cellular or mobile phone gateway service such as a node B or base transceiver station (BTS) and a wireless communications network, or short-range wireless communications to other devices located remotely from the apparatus.

Furthermore in some embodiments the apparatus 10 can comprise a processor further linked to the transceiver and display which can control the operation of the transceiver and/or pass data or receive data from the transceiver. In some embodiments the processor can be located within the main section 14 of the apparatus.

The apparatus in some embodiments can further comprise a memory to which the processor is connected. In some embodiments the memory can be located within the main section 14 of the apparatus. The processor can in some embodiments be configured to execute various program codes. The implemented program codes can be stored for example in the memory and specifically within a program or instruction section part of the memory for retrieval by the processor whenever needed. The memory in some embodiments can further comprise a section for storing data received from any further device.

The apparatus 10 as described above can in some embodiments comprise a foldable section 16 or movable section or any suitable movable means. The foldable section 16 in some embodiments comprises an earpiece port or hole 20 or any suitable transducer port. With respect to FIG. 1a the foldable section 16 is shown in a first (folded) mode of operation folded "underneath" or to the "rear" of the main section 14 of the apparatus 10 and furthermore located within a suitable recess formed by the main section 14 such that the apparatus 10 is a relatively uniform shape.

With respect to FIG. 1b the foldable section 16 is shown operable or configured in a second mode of operation whereby the foldable section 16 exposes to the same side or face as the display 12 the earpiece hole 20.

The earpiece hole 20 in some embodiments may be any suitable earpiece port for enabling the output of acoustic waves generated via an acoustic or audio transducer located within the apparatus 10. The earpiece hole 20 thus is configured in such embodiments to provide an acoustically transparent or opaque window between the outside/external part of the apparatus 10 and the earpiece/loudspeaker chamber not shown.

In some embodiments the acoustic or audio transducer is furthermore located within the foldable section 16. In some embodiments the foldable section 16 is configured to receive electronic signals via suitable connection or couplings from the main section 14 for generating a suitable drive signal to produce the audio or acoustic waves via the acoustic or audio transducer.

In some further embodiments the foldable section 16 comprises an acoustic coupling to the main section 14 which comprises the acoustic or audio transducer.

In some embodiments the foldable section 16 comprises an acoustic tuned cavity for producing suitable acoustic enhancement to the audio or acoustic waves generated by the transducer.

In some embodiments the earpiece hole 20 can be coupled to a speaker chamber (not shown) located within either the foldable section 16 or the main section 14.

It is understood that the structure of the apparatus 10 can be supplemented and varied in many ways and that the example shown in FIGS. 1a, 1b, 2a, 2b, 2c, 3a and 3b represent only part of the operation of a device 10 comprising exemplary embodiments.

The apparatus 10 can in some embodiments further comprise a camera for capturing visual images or multiple video images. As shown in FIG. 1b the foldable section furthermore comprises a camera lens 22 for focusing image data on a suitable image capturing apparatus (not shown) which can be part of the camera.

As also shown in FIG. 1b the foldable section in the second mode of operation is configured to not only provide an earpiece hole 20 but a suitable area around the earpiece hole 20 for providing a suitable sealing surface when the apparatus is located against the user's ear and which produces a positive earpiece performance. In some embodiments the foldable section 16 in the second mode of operation, the unfolded mode, is arranged such that the suitable sealing surface located against or near to the user's ear when in use comprise the surface surrounding the earpiece hole on the foldable section and the surface of the main body. Thus the foldable section 16 in such embodiments can be configured with the earpiece hole 20 located nearby the interface of the foldable section 16 and the main section 14 to help reduce the size of the foldable section.

With respect to FIGS. 2a, to 2i show suitable folding mechanisms for the apparatus 10 is shown.

Figure 2B:
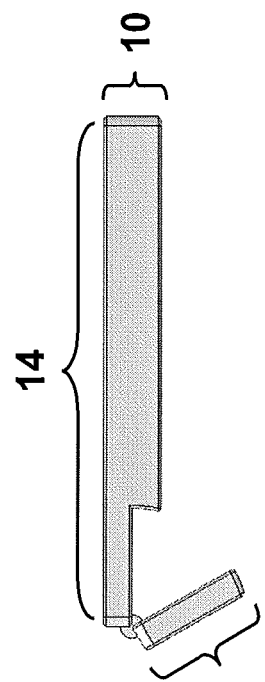
FIG. 2b shows schematically an elevation of the electronic device shown in FIG. 1a in an intermediate mode of operation.
Figure 2C:
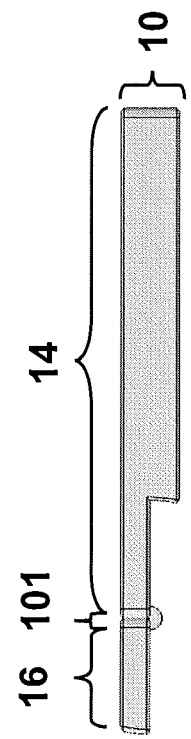
FIG. 2c shows schematically an elevation of the electronic device shown in FIG. 1a in the second mode of operation.

With respect to FIGS. 2a to 2c a first mechanism example is shown wherein the main section 14 is shown connected or coupled to the foldable section 16 via a hinge or pivot 103. The hinge or pivot 103 is configured to provide at least a mechanical coupling between the main section 14 and the foldable section 16. However as described later any suitable coupling means can be used to permit relative motion between the foldable section 16 and the main section 14.

Furthermore in some embodiments the hinge or pivot 103 is configured to provide electrical coupling and/or acoustic coupling between the main section 14 and foldable section 16. As can be seen with respect to FIG. 2a the folding section is orientated relative to the main section 14 so that if the display face is defined as the "front" of the apparatus 10 then the earpiece hole 20 would be located or orientated on the opposite or "rear" face of the apparatus.

With respect to FIG. 2b the operation of the folding of the foldable section 16 with respect to the main section 14 is shown in an intermediate mode of operation between the first "folded" and second "unfolded" modes of operation whereby the foldable section 16 is configured to be in some embodiments rotatable about the hinge or pivot 103. The hinge or pivot 103 thus is connected at one point to one edge of the main section 14 and at a further point to one edge of the folding section 16. Furthermore with respect to FIG. 2c the foldable section 16 with respect to the main section 14 is such that the earpiece hole 20 is orientated on the same face the "front" face of the apparatus as the display 12 when the foldable section is in the second unfolded mode of operation. Furthermore as can be seen with respect to FIG. 2c the interface with respect to the surfaces of the main section 14 and the foldable section 16 can be configured to produce a smooth surface interface 101.

With respect to FIGS. 2d to 2f a second mechanism example is shown wherein the main section 14 is shown connected or coupled to the foldable section 16 via a hinge or pivot. As can be seen with respect to FIG. 2d the foldable section 16 is orientated relative to the main section 14 so that if the display face is defined as the "front" of the apparatus 10 then the earpiece hole 20 would be located or orientated on the opposite or "rear" face of the apparatus. However the foldable section 16 in the second example is shaped such that it has a section nearest the hinge approximately the same thickness as the main section 14 near the hinge and a tapering along the folding section such that when the folding section is in a fully open mode there is a continuous tapering profile between the main section and foldable section to the rear of the apparatus.

With respect to FIGS. 2g to 2i a third mechanism example is shown wherein the main section 14 is shown connected or coupled to the foldable section 16 via a hinge or pivot. As can be seen with respect to FIG. 2g the foldable section 16 is orientated relative to the main section 14 so that if the display face is defined as the "front" of the apparatus 10 then the earpiece hole 20 would be located or orientated on the opposite or "rear" face of the apparatus. However the foldable section 16 in the third example is shaped such that the folding section has a portion missing nearest the hinge such that when the folding section is in a fully open mode the missing section permits the angle between the plane of the main section and foldable section to be less than 180 degrees. In other words the folding section can form a 'chin' type effect which can be more acceptable when using it to form a acoustic capture or microphone structure.

Although FIGS. 2a to 2i show a hinge or pivot configuration, enabling the foldable section 16 to move relative to the main section 14, and in the example shown in FIGS. 2a to 2i a rotational movement any other suitable configuration for providing the ability to move the foldable section 16 between the first "folded" mode position and the second "unfolded" mode position can be implemented. For example in some embodiments the foldable section 16 can be connected via a series of mechanical couplings configured to produce a translational rather than rotational motion from the recess part of the main section. Thus in such embodiments the earpiece hole 20 and the camera lens 22 can be protected against the rear recess face by being in the first mode of operation behind the main section 14.

In some other embodiments the coupling between the main and foldable sections can be implemented by a lockable, releasable lockable coupling. In other words the coupling can be locked into a position, for example in the foldable mode to prevent the foldable section from moving under the force of the foldable section weight. In some embodiments this could be achieved mechanically or by any suitable means such as a magnetic coupling (whereby magnets with opposite poles are located on the main and foldable sections to provide an attractive and locking force.

In some embodiments the coupling between the main and foldable sections can be implemented by a motorized coupling capable of moving the foldable section relative to the main section without any user applied force.

With respect to FIGS. 3a and 3b a plan elevation view of the hinge or pivot 103 is shown in further detail. The hinge or pivot 103 is shown comprising a first part 201, a second part 203, and a third part 205. The first and third part 201, 205 can, for example, be configured to be physically connected to part of an edge of the main section 14. Furthermore the second part 203 is physically connected to or part of an edge of the foldable section 16. The first, second and third parts are coupled such that as the foldable section is rotated the second part 203 rotates relative to the first and third parts but is located rotationally along substantially the same centre of rotation. In some embodiments this rotation along substantially the same centre of rotation is achieved by a physical locating means for example a "pin" passing through all three hinge parts 201, 203, 205.

Although the above examples show only a single foldable section 16 it would be appreciated that in some embodiments there can be multiple foldable sections. In such embodiments each foldable section can comprise a suitable earpiece speaker integration. For example in some embodiments a first foldable section can be located at one edge or end of the apparatus and a second foldable section located at an opposite end of the apparatus such that when both foldable sections are operated in the second unfolded mode of operation (in other words directed along substantially the same plane as the display) a pseudo stereo or stereo speaker arrangement is created. Similarly by mounting separate camera lens and capture apparatus on each of the foldable sections a three dimensional image can be captured.

Furthermore in some embodiments each foldable section 16, when in an unfolded mode of operation, can be configured to capture an image. Such embodiments can therefore determine a user position and furthermore operate the playback transducers to adjust the 'directionality' of the audio signal being output by the playback transducers.

With respect to FIG. 4 a series of views of a multiple foldable section arrangement are shown. The main section 14 of the device 10 as shown previously comprises the display 12. The device furthermore comprises a first foldable section 16a comprising the earpiece hole and can be configured to operate in a fully open position in order to align the earpiece substantially with the 'front' face of the main section 14 (in other words the display face). The device furthermore comprises a further foldable section 16b connected to the opposite edge of the main section 14.

The foldable section furthermore in some embodiments can be shaped in such a way to operate as a means for standing or supporting the device 10 for viewing the display 12. In the example shown in FIG. 4 the folding section 16a and 16b comprises at least one bevel edge 403 which is configured to support the device 10 on a surface 401 when the folding section is operated or positioned in an intermediate position between the fully open and fully closed modes or positions In some embodiments the foldable section 16a/16b can comprise more than one bevel edge or bevel angle to permit more than one possible stable supporting angle for the device. Furthermore in some embodiments the foldable section can be shaped to have a chamfered edge suitable for supporting the device 10. It would be understood that the shaped edge can furthermore in some embodiments have a high friction coating or surface to prevent the device 10 slipping or sliding as it is being supported by the foldable section 16.

Although the above examples have shown a folded and unfolded modes of operation of the foldable sections whereby the unfolded mode of the foldable section is in alignment with the display, it would be understood that in some embodiments the foldable sections can be located so to produce an acute or obtuse alignment with the front face of the main section, for example to shield or shade the display from strong sunlight.

In some embodiments the apparatus 10 is configured to monitor the position of the foldable section 16 and control the earpiece/speaker transducer to operate in a mode dependent on the position. For example in some embodiments the speaker/earpiece transducer can be operated in an earpiece mode where the foldable section is in the "unfolded" second mode in line with the display and in an integrated handsfree mode of operation when the earpiece hole is located in a different plane to the display, in other words in an intermediate or unfolded mode of operation.

In some embodiments at least one of the foldable sections can comprise or be acoustically coupled to at least one transducer operating as a microphone. In some embodiments the microphone (in other words the transducer or acoustic input to the microphone) can be located such that when the foldable section is in a 'unfolded' mode the microphone faces away from the 'front' face of the device (in other words away from the direction of the earpiece hole and display) and thus is suitable for monitoring 'background' noise for possible background noise cancellation operations by the device.

In some further embodiments the foldable section 16 'microphone' can be located on the same face as the earpiece hole and be configured to assist in beamforming and/or microphone array processing in combination with the main section 14 microphone.

It would be appreciated that the use of a foldable section with respect to the main section provides the possibility of an increased display surface relative to the apparatus whilst allowing an optimal earpiece area or potentially reducing the device size such that only the display is required as the front face of the apparatus.

It shall be appreciated that the term electronic device and user equipment is intended to cover any suitable type of wireless user equipment, such as mobile telephones, portable data processing devices or portable web browsers.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be designed by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits (such as field programmable gate array—FPGA circuits) and processors based on multi-core processor architecture, as non-limiting examples.

Embodiments of the inventions may be practiced in various components such as integrated circuit modules. The design of PWB and RF designs are by and large a highly automated process. Complex and powerful software tools are available for converting a design into a Printed Wired Board design ready to be etched and formed on a substrate.

Programs automatically route conductors and locate components on a substrate using well established rules of design as well as libraries of pre-stored design modules. Once the design for a substrate or circuit has been completed, the resultant design, in a standardized electronic format may be transmitted to a fabrication facility or for fabrication.

As used in this application, the term 'circuitry' refers to all of the following:

(a) hardware-only circuit implementations (such as implementations in only analog and/or digital circuitry) and (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
   a main section comprising a display located on a first face of the main section, the first face of the main section being void of any sound outlet;
   at least one movable section coupled to the main section, the at least one movable section comprising at least one acoustic transducer port located on a first face of the at least one movable section, wherein in a fully open position the first face of the at least one movable section forms a substantially planar extension of the first face of the main section and locates the first face of the at least one movable section with the at least one acoustic transducer port on substantially the same first face as the main section with the display, where the first face of the at least one movable section forms a substantially smooth surface with the first face of the main section and in a fully closed position the at least one acoustic transducer port is not visible when viewing the display;
   the first face of the main section having a first overall size when the first face of the at least one movable section is in the fully closed position, and the first face of the main section along with the first face of the at least one movable section in the fully open position forming a second overall size that is larger than the first overall size; and
   a pivot joint connecting the at least one movable section to the main section, the pivot joint having a single axis of rotation allowing the at least one movable section to rotate more than 90 degrees between the fully closed position and the fully open position.

2. The apparatus as claimed in claim 1, wherein the at least one movable section and the main section having formed the substantially smooth surface co-operate to produce an acoustic sealing surface.

3. The apparatus as claimed in claim 1, wherein the main section comprises a second face and in another mode of operation the first face of the at least one movable section is configured to form an extension of the second face of the main section to locate the at least one acoustic transducer port on a different face relative to the display.

4. The apparatus as claimed in claim 3, wherein the main section further comprises a recess and in the other mode of operation the at least one movable section is located within the main section recess such that the at least one movable section does not affect the overall size of the first face of the main section and the at least one movable section rotates approximately 180 degrees from the fully open position to the fully closed position within the main section recess.

5. The apparatus as claimed in claim 1, wherein in a further mode of operation the at least one movable section is configured to locate the at least one movable section in a plane relative to the main section.

6. The apparatus as claimed in claim 1, further comprising at least one acoustic transducer coupled to the at least one acoustic transducer port.

7. The apparatus as claimed in claim 6, wherein the at least one acoustic transducer comprises at least one of:
   an earpiece;
   a speaker;
   a microphone; and
   an integrated handsfree speaker.

8. The apparatus as claimed in claim 6, wherein the at least one acoustic transducer is located in the at least one movable section.

9. The apparatus as claimed in claim 1, wherein the at least one movable section further comprises an image capturing apparatus located on the first face of the at least one movable section.

10. The apparatus as claimed in claim 1, wherein the at least one movable section is configured to support the main section on a surface.

11. The apparatus as claimed in claim 10, wherein the at least one movable section comprises at least one of:
   a chamfered edge;
   a filleted edge;
   a shaped edge; and
   a bevelled edge.

12. The apparatus as claimed in claim 1, further comprising a coupling configured to couple the at least one movable section and the main section.

13. The apparatus as claimed in claim 12, wherein the coupling configured to couple the at least one movable section and the main section comprises at least one of:
   a hinge;
   a slider;
   a lockable coupling;
   a motorized coupling;
   a mechanical coupling
   an acoustic coupling; and
   an electrical coupling.

14. A method comprising:
   coupling a main section comprising a display located on a first face of the main section and at least one movable section together with a pivot joint, wherein the at least one movable section comprises at least one acoustic transducer port located on a first face of the at least one movable section and the first face of the main section is void of the at least one acoustic transducer port; and
   locating the first face of the at least one movable section when in a fully open position to form a substantially planar extension of the first face of the main section such that the at least one acoustic transducer port is located on substantially the same first face of the main section with the display when the at least one movable section is in the fully open position and where the first face of the at least one movable section forms a substantially smooth surface with the first face of the main section and in a fully closed position the at least one acoustic transducer port is not visible when viewing the display;
   forming the first face of the main section to have a first overall size when the at least one movable section is in the fully closed position, and forming a second overall size by combining the first face of the main section with the first face of the at least one movable section in the fully open position, the second overall size being larger than the first overall size; and
   the pivot joint having a single axis of rotation allowing the at least one movable section to rotate more than 90 degrees between the full closed position and the fully open position.

15. The method as claimed in claim 14, wherein the at least one movable section and the main section having formed the substantially smooth surface co-operate to produce an acoustic sealing surface.

16. The method as claimed in claim 14, wherein the main section comprises a second face, the method further comprising:
   locating the first face of the at least one movable section to form an extension of the second face of the main section such that the at least one acoustic transducer port is located on a different face to the display.

17. The method as claimed in claim 16, wherein the main section further comprises a recess and locating the first face of the at least one movable section to form an extension of the second face of the main section further comprises locating the at least one movable section within the main section recess.

18. The method as claimed in claim 14, further comprising coupling at least one acoustic transducer to the at least one acoustic transducer port.

19. The method as claimed in claim 18, wherein the acoustic transducer comprises at least one of:
   an earpiece;
   a speaker;
   a microphone; and
   an integrated handsfree speaker.

20. The apparatus as claimed in claim 1, wherein the apparatus is a portable electronic device.

21. An apparatus comprising:
   a main section comprising a display located on a first face of the main section, the first face of the main section being void of any sound outlet;
   at least one movable section coupled to the main section, the at least one movable section comprising at least one acoustic transducer port located on a first face of the at least one movable section, wherein in a fully open position the first face of the at least one movable section forms a substantially planar extension of the first face of the main section and the at least one acoustic transducer port is located on substantially the same first face of the main section with the display, where the first face of the at least one movable section and the first face of the main section form a surface for receiving a user's ear and the interface between the at least one movable section and the main section does not interfere with the user's ear contacting the surface and in a fully closed position the at least one acoustic transducer port is not visible when viewing the display;
   the first face of the main section having a first overall size when the first face of the at least one movable section is in the fully closed position, and the first face of the main section along with the first face of the of the at least one movable section in the fully open position forming a second overall size that is larger than the first overall size; and a pivot joint connecting the at least one movable section to the main section, the pivot joint having a single axis of rotation allowing the at least one movable section to rotate more than 90 degrees between the fully closed position and the fully open position.

22. The apparatus as claimed in claim 1, where the at least one movable section includes an acoustically tuned cavity for enhancing audio.

\* \* \* \* \*